United States Patent
Narita et al.

[11] Patent Number: 5,431,995
[45] Date of Patent: Jul. 11, 1995

[54] SHEET MOLDING COMPOUND

[75] Inventors: Masahiro Narita, Aichi; Kiyotaka Nakai, Chita; Masamichi Togo, Sakai, all of Japan

[73] Assignee: Aisin Seiki Kabushiki Kaisha, Kariya, Japan

[21] Appl. No.: 63,680

[22] Filed: May 20, 1993

[30] Foreign Application Priority Data

May 22, 1992 [JP] Japan .................. 4-130903

[51] Int. Cl.⁶ .................. B32B 27/04; B32B 27/06
[52] U.S. Cl. .................. 428/287; 428/284; 428/285; 428/286; 428/325
[58] Field of Search .............. 428/286, 287, 325, 284, 428/285, 35.7, 36.2, 36.3, 304.4

[56] References Cited

U.S. PATENT DOCUMENTS

| | | | |
|---|---|---|---|
| 4,013,810 | 3/1977 | Long | 428/323 X |
| 4,250,136 | 2/1981 | Rex | 428/325 X |
| 4,547,408 | 10/1985 | Cassat et al. | 428/901 X |
| 4,784,899 | 11/1988 | Ono et al. | 428/287 X |
| 4,798,762 | 1/1989 | Okada et al. | 428/286 X |
| 4,992,325 | 2/1991 | Kim et al. | 428/325 X |
| 5,037,691 | 8/1991 | Medney et al. | 428/285 X |
| 5,126,172 | 6/1992 | Dore, III | 428/287 X |

FOREIGN PATENT DOCUMENTS 60-21219 2/1985 Japan.
63-193940 11/1988 Japan.

*Primary Examiner*—Daniel R. Zirker
*Attorney, Agent, or Firm*—Burns, Doane, Swecker & Mathis

[57] ABSTRACT

A light weight molding compound comprises an inner layer constituted by a thermosetting resin including a hollow filler, cloth layers constituted by woven or nonwoven fabric adhered on the both surfaces of the inner layer, and surface layers constituted by a thermosetting resin including reinforcing fiber and integrally connected to the both surfaces of the inner layer by way of the cloth layers. The light weight sheet molding compound has superior surface quality to be painted after molding.

6 Claims, 3 Drawing Sheets

SHEET MOLDING COMPOUND

BACKGROUND OF THE INVENTION

1. Field of the Invention

The present invention relates to a light weight sheet molding compound.

2. Brief Description of the Prior Art

Recently, two-layered sheet molding compounds comprising a layer including reinforcing fiber and a layer including no reinforcing fiber have been used for an engine hood and outside plates of an automobile, for example, a rear spoiler, a roof, a hood and so on. These sheet molding compounds include a hollow filler in order to reduce the weight.

The light weight sheet molding compounds are produced as follows: Resin paste for compounds including a hollow filler is applied on two polyethylene films respectively at a predetermined thickness. Then, roving glass fiber is cut and scattered uniformly on one spread resin paste, thereby placing reinforcing fiber. Then, the other resin paste applied film is laminated thereon to make the laminated layers into one integral sheet. Therefore, as shown in FIG. 5, a conventional sheet molding compound 30 comprises an inner layer 31 including reinforcing fiber, and resin layers 32 including a hollow filler 33 and disposed on the both sides of the inner layer 31.

The viscosity of the sheet molding compound 30 varies with the heat for molding and hardening the compound 30. At that time, the filler 33 which has been dispersed in the resin paste and which has a smaller specific gravity than the base resin tends to move upward and concentrate on the surface. A part of the hollow filler 33 breaks or cracks by shearing force applied during molding the compound 30. These broken materials and the gas which has been contained in the filler 33 are scattered on the surface of the sheet molding compound 30. Therefore, the surface to be painted is not always smooth, and a paint film formed on the compound 30 often develops coating defects such as blisters. After-treatment such as repair of coating defects is required and productivity is decreased.

As an attempt to remove these disadvantages, Japanese Unexamined Patent Publication (KOKAI) No. 193940/1988 proposes a low specific gravity sheet molding compound in which one resin sheet layer in contact with the other resin sheet layer by way of reinforcing fiber includes no hollow filler, and a low specific gravity sheet molding compound in which one resin sheet layer includes a smaller amount of a hollow filler than the other resin sheet layer.

In the above sheet molding compounds in which the resin sheet layer on the surface side includes no hollow filler or a smaller amount of a hollow filler, however, only short fiber exists as reinforcing fiber between the one resin sheet layer and the other resin sheet layer including a larger amount of the hollow filler, and the filler can easily pass through the reinforcing fiber. Therefore, when the resin viscosity is lowered during heating for hardening the resin, it is difficult to inhibit the low specific gravity filler from passing through the reinforcing fiber and transferring to the surface side of the resin sheet layer. Further, it is sometimes hard to hold the resin layer including a smaller amount of the hollow filler on the upper side. Therefore, the sheet molding compound surface to be painted is difficult to be kept smooth, and appearance defects such as blisters are often developed in a paint film formed on the sheet molding compound surface. The coating defects necessitate repairing steps. Accordingly, productivity enhancement by removing steps of repairing the paint film is required to be used as panel component parts.

SUMMARY OF THE INVENTION

The present invention has been conceived in view of the above circumstances. It is an object of the present invention to provide a light weight sheet molding compound having superior surface quality to be painted after molding.

The sheet molding compound according to the present invention comprises an inner layer constituted by a thermosetting resin including a hollow filler, cloth layers constituted by woven fabric or non-woven fabric adhered on the both surfaces of the inner layer, and surface layers constituted by a thermosetting resin including reinforcing fiber and integrally connected to the both surfaces of the inner layer by way of the cloth layers.

The inner layer is formed by mixing a hollow filler in resin paste which constitutes the sheet molding compounds. Examples of the hollow filler are hollow glass balloons, hollow plastic beads, hollow ceramic balloons, and foam plastic beads. The specific gravity of the hollow filler is preferably from 0.1 to 1.2 in view of the effects of reducing the weight and keeping up the strength of moldings produced from the sheet molding compound. The specific gravity is more preferably from 0.3 to 0.5 to make the effects remarkable. Further, in general, the amount of the filler is preferably 15% by volume or more. The filler amount is more preferably from 20% by volume to 60% by volume in view of the superior effects of reducing the weight and keeping up the strength of moldings produced from the sheet molding compound.

The resin paste may include an ordinary filler such as calcium carbonate.

The resin paste constituting the sheet molding compound may be any ordinary resin to be used for sheet molding compounds. Examples of the resin paste are thermosetting resins such as epoxy resin, unsaturated polyester resin, vinyl ester resin, urea resin, melamine resin, and phenol resin.

Examples of the cloth layers to be adhered on the surfaces of the inner layer are woven fabric or non-woven fabric produced from organic fiber such as aramid fiber, polyester fiber, nylon fiber and so on, and woven fabric or non-woven fabric produced from inorganic fiber such as glass fiber, ceramic fiber, ceramic whisker and so on. When woven fabric is used as cloth layers, a binder is preferably applied on the texture to make the texture gaps smaller. More preferably, the area of one texture gap with the binder applied is 0.5 mm$^2$ or less. In the cloth layers having the above texture gap area, since the gap area is smaller than the diameter of the ordinary hollow filler, the filler is prevented from passing through the cloth layers and transferring to the surface of the upper layer. Therefore, it is possible to prevent defects on the surface of the sheet molding compounds due to the existence of the hollow filler. On the other hand, when non-woven fabric is used as cloth layers, the weight of the fabric is preferably from 5 to 300 g/m$^2$ in view of the superior strength and superior adhesion to the resin paste. More preferably, the fabric weight is from 10 to 100 g/m² to make these effects remarkable.

The surface layers are constituted by a resin including reinforcing fiber. Examples of the reinforcing fiber are glass fiber, organic fiber, and other inorganic fiber. For example, the glass fiber may be produced by twisting 50 to 5000 glass filaments of 5 to 30 microns into a strand and cutting the strand into a length of about one-eighth inch to 4 inches. More preferably, the strand length is from a half inch to 2 inches. The amount of the reinforcing fiber to be mixed in the surface layers is preferably 20% by volume or more. More preferably, the reinforcing fiber amount is from 20 to 50% by weight, in view of the superior strength of moldings produced from the sheet molding compounds.

The resin paste constituting the surface layers can have the same composition as the inner layer.

In producing the sheet of the sheet molding compound, the both surfaces of the sheet are preferably covered with films in view of easy production and handling. Generally, the films are polyethylene films or the like which can be easily peeled off from the molded sheet.

The sheet molding compound covered with films can be produced, for example, as follows. First, paste resin for the surface layers is spread on two films, and reinforcing fiber is scattered on the paste resin at a predetermined thickness. Next, cloths constituting the cloth layers are placed thereon. Then, resin paste including a hollow filler is spread on one cloth layer surface, and laminated on the resin paste spread surface is the other film on which the resin paste and the reinforcing fiber are spread and the other cloth layer are further placed. Then the laminated layers are pressed and wound, thereby forming a sheet continuously. The continuous sheet is cut into a predetermined length and hardened by pressure molding, thereby producing a molding material. The molding material is molded under pressure, thereby producing moldings. The moldings can be used as panels or the like by painting the surface.

The sheet molding compound according to the present invention is in the form of a sheet comprising three resin paste layers: The two outer layers including reinforcing fiber are respectively connected to the both surfaces of one inner layer including a hollow filler, and in the boundaries of the inner layer and the two outer layers, cloth layers are formed by cloths with small texture gaps. Because these cloth layers divide the inner layer and the surface layers, the low specific gravity hollow filler is inhibited from moving upward due to the low specific gravity., even when the viscosity of the resin varies. Therefore, the hollow filler is prevented from concentrating on the upper surface, and faults caused by damage on the hollow filler during molding are prevented. As a result, the surface of the sheet molding compound is kept smooth, and a paint film formed on the sheet molding compound is free from blisters and other appearance defects.

In summary, in the sheet molding compound according to the present invention, since the filler does not exist on the surface after molding, appearance defects such as blisters are prevented when the surface is coated with paint.

Accordingly, troublesome steps of repairing the surface defects are no longer required, decrease in yield due to the detects is inhibited, and production costs can be lowered.

BRIEF DESCRIPTION OF THE DRAWINGS

Other objects and features of the invention will become apparent to those skilled in the art as the disclosure is made in the description of preferred embodiments of the invention, as illustrated in the accompanying sheets of drawings, in which.

DESCRIPTION OF THE PREFERRED EMBODIMENTS (The First Preferred Embodiment)

Figure 1:
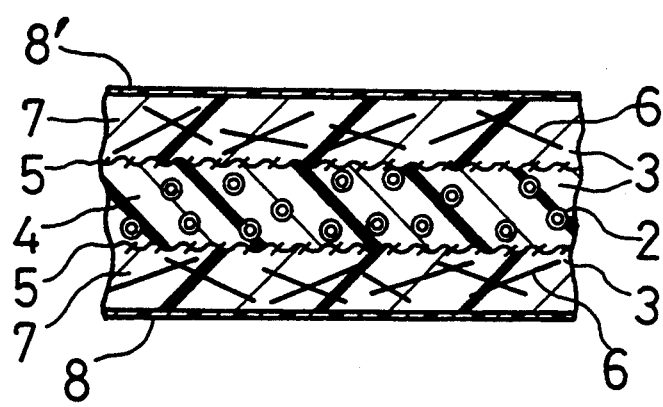
FIG. 1 shows a cross sectional diagram of a sheet molding compound according to a first preferred embodiment of the present invention.

Referring first to FIG. 1, a sheet molding compound 1 according to a first preferred embodiment of the present invention comprises three resin layers: an inner layer 4 constituted by inner resin paste 3 in which a hollow filler 2 is dispersed in a thermosetting resin, cloth layers 5 constituted by woven or non-woven fabric adhered on the both surfaces of the inner layer 4, surface layers 7 constituted by a thermosetting resin in which reinforcing fiber 6 is dispersed and integrally connected to the both surfaces of the inner layer 4 by way of the cloth layers 5. The both surfaces of the sheet molding compound 1 are covered and protected by polyethylene films 8, 8'.

Figure 2:
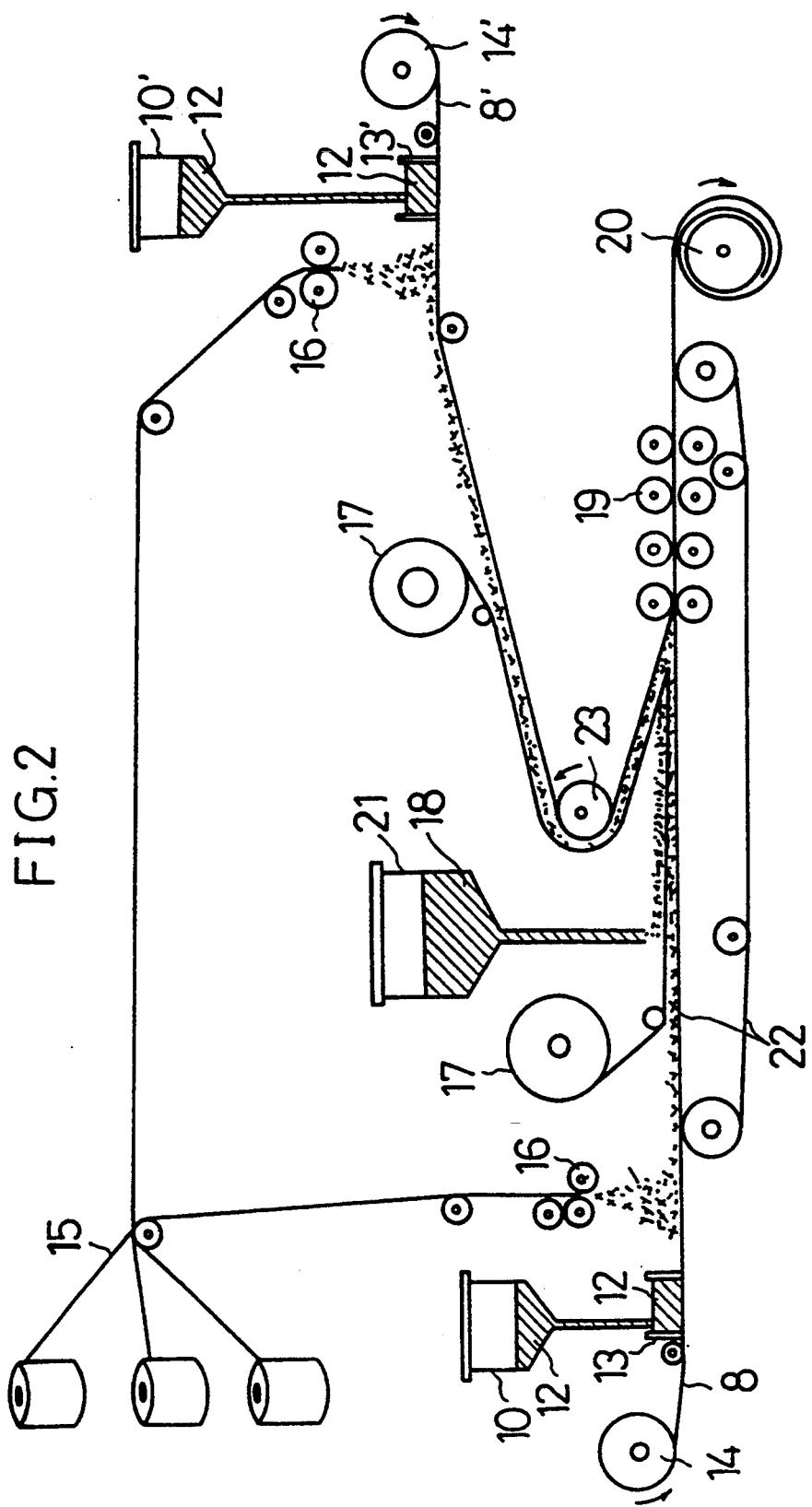
FIG. 2 shows a schematic diagram of production steps of a sheet molding compound according to the present invention.

FIG. 2 shows a schematic diagram of production steps according to the first preferred embodiment of the present invention. Referring now to FIG. 2, the production steps and constitution of the sheet molding compound 1 will be described.

Resin paste 12 for one surface layer 7 of the sheet molding compound 1 was stored in a resin supply tank 10 and stirred sufficiently. The resin paste 12 was unsaturated polyester resin including an ordinary filler such as calcium carbonate ('Polylite PS-260' manufactured by DAINIPPON INK KAGAKU KOGYO CO., LTD.). The stirred resin paste 12 was supplied to a doctor blade 13 through a pipe, and a predetermined amount of the resin paste 12 was continuously spread by the doctor blade 13 on a polyethylene film 8 which was supplied from a polyethylene film roll 14.

Next, glass roving 15 as the reinforcing fiber 6 was supplied above the polyethylene film 8 on which the resin paste 2 had been spread, and continuously cut into a length of about 25 mm by a cutter 16. The cut glass roving as short fiber was uniformly scattered on the spread resin paste 12 so that the surface layer 7 contained the reinforcing fiber by 35% by volume. Thus, the polyethylene film 8 on which the surface layer 7 was formed was produced.

This polyethylene film 8 was conveyed on a belt 22 which was driven by rollers, and a surface mat 17 made of glass fiber non-woven fabric ('SM3600E' manufactured by ASAHI FIBER GLASS CO., LTD., the weight: 30 g/m²) was continuously supplied on the upper surface of the polyethylene film 8 on which the reinforcing fiber 6 was dispersed, and overlaid and adhered on the reinforcing fiber 6, thereby forming one cloth layer 5.

In this case, it is preferable to apply the resin paste 12 on the surface mat 17 beforehand in order to remove the air between the reinforcing fiber 6 and the surface mat 17 and enhance the impregnating ability of the resin.

Then, the resin paste 12 (the unsaturated polyester resin including an ordinary filler such as calcium carbonate ('Polylite PS260' manufactured by DAINIPPON INK KAGAKU KOGYO CO., LTD.)) was stored in a resin tank 21, and glass microballoons having a specific gravity of 0.5 were mixed with the resin paste 12 to be contained by 45% by volume and sufficiently stirred. The mixture 18 was supplied on the surface mat 17 at a certain thickness through a pipe to form the inner layer 3.

Separately, as well as above, the resin paste 12 for the other surface layer 7 of the sheet molding compound 1 (the unsaturated polyester resin including an ordinary filler such as calcium carbonate ('Polylite PS-260' manufactured by DAINIPPON INK KAGAKU KOGYO CO., LTD.)) was stored in a resin supply tank 10', and supplied to a doctor blade 13' through a pipe. Then, a predetermined amount of the resin paste 12 was continuously spread by the doctor blade 13' on a polyethylene film 8' which was supplied from a polyethylene film roll 14'.

Further, the glass roving 15 was supplied and continuously cut into a length of about 25 mm by another cutter 16, and the glass roving as short fiber was scattered on the resin paste 12 in order to be contained by 35% by volume in the surface layer 7. Thereby, the polyethylene film 8' on which the surface layer 7 was formed was produced.

This polyethylene film 8' was conveyed on a belt 22 which was driven by rollers, and a surface mat 17 made of a glass fiber non-woven fabric (SM3600E' manufactured by ASAHI FIBER GLASS CO., LTD., the weight: 30 g/m$^2$) was continuously supplied on the surface of the polyethylene film 8' on which the reinforcing fiber 6 was scattered, and overlaid and adhered on the reinforcing fiber 6, thereby forming the other cloth layer 5. The resin paste side of the polyethylene film 8' was reversed by a roller 23 and overlaid on the polyethylene film 8.

The surface layers 7 overlaid on the inner layer 3 were compressed by compression rollers 19, whereby the resin paste 12 was sufficiently impregnated into the reinforcing fiber 6 and the surface mats 17. Then the sheet molding compound 1 the both surfaces which were covered with the polyethylene films 8, 8' was wound around a take-up roller.

The wound sheet molding compound 1 with the both surfaces covered with the polyethylene films 8, 8' has a cross section shown by FIG. 1.

The sheet molding compound 1 was thermoset by pressure molding under a pressure of 70 kg/cm$^2$ at a temperature of 145° C. for three minutes into a flat plate sheet. The cross section of the flat plate sheet remained almost the same as that of the sheet molding compound before molding shown in FIG. 1. The flat plate sheet was cut into a flat plate of 300×300×2.5 mm in dimensions, and one surface of the flat plate was coated with urethane paint. Then, the number of blisters was examined on the paint film immediately after painting and after being left in water at 40° C. for 240 hours. The results are shown in Table 1.

TABLE 1

|  | Example No. 1 | Example No. 2 | Example No. 3 | Comparative Example |
|---|---|---|---|---|
| Number of blisters soon after painting | 0 | 0 | 0 | 2 |
| Number of blisters after being left at 40° C. for 240 hours | 0 | 0 | 0 | 7 |

No blisters were observed on the paint film both immediately after painting and after being left in water at 40° C. for 240 hours.

(The Second Preferred Embodiment)

A sheet molding compound 1' was produced by using the same materials by the same production method as in the first preferred embodiment, except that polyester fiber non-woven fabric ('20207WTD' manufactured by UNICHIKA KABUSHIKI KAISHA) was used instead of the surface mats 17 constituting the cloth layers 5.

The sheet molding compound 1' was press molded into a flat plate sheet in the same way as in the first preferred embodiment, and coated with the paint and the number of blisters was examined immediately after painting and after being left in water at 40° C. for 240 hours in the same way as the first preferred embodiment. As shown in Table 1, no blisters were observed.

(The Third Preferred Embodiment)

A sheet molding compound 1" was produced by using the same materials by the same producing method as in the first preferred embodiment, except that glass cloth ('WF110D100BS6' manufactured by NITTO BOUSEKI KABUSHIKI KAISHA (the weight: 97 g/m$^2$, the density: 19 warps/25 mm, 18 weft/25 mm)) was used instead of the surface mats 17 constituting the cloth layers 5.

The sheet molding compound 1" was press molded into a flat plate sheet and coated with the paint in the same way as in the first preferred embodiment. Then, the number of blisters was examined immediately after painting and after being left in water at 40° C. for 240 hours. No blisters were observed.

(Comparative Example)

A sheet molding compound was produced in a production line where the surface mats 17, and the resin paste 12 and glass chopped fiber for one surface were not used in the production steps of FIG. 2.

Figure 3:
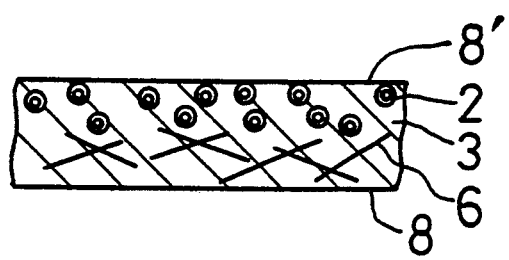
FIG. 3 shows a cross sectional diagram of a comparative sheet molding compound.
Figure 4:
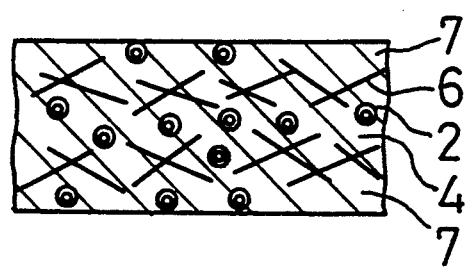
FIG. 4 shows a cross sectional diagram of the molding which was produced by overlaying and molding two comparative sheet molding compounds.
Figure 5:
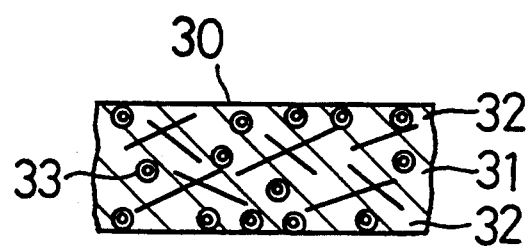
FIG. 5 shows a cross sectional diagram of a conventional sheet molding compound.

The cross section of the obtained sheet molding compound is shown in FIG. 3. The sheet molding compound comprises two layers: a resin paste layer including a hollow filler 2, and a resin paste layer including glass fiber 6. Two sheet molding compounds thus produced were overlaid to face the resin paste layers including the hollow filler 2 each other, and the thus produced comparative sheet molding compound having a three layer structure was molded in the same way as in the first preferred embodiment. Referring now to FIG. 4, since there was no cloth layers 5 between the surface layers 7 and the inner layer 4, the low specific gravity filler passed through the reinforcing fiber 6 and moved to the surface layers 7.

On account of this, the painted comparative sheet molding compound had two blisters immediately after painting and seven blisters after being left in water at 40° C. for 240 hours, as shown in Table 1.

This examination showed that the painted sheet molding compounds having constitutions according to the present invention were suppressed from blistering.

Obviously, many modifications and variations of the present invention are possible in the light of the above teachings. It is therefore to be understood that within the scope of the appended claims, the invention may be practiced otherwise than as specifically described.

What is claimed is:

1. A molded sheet article free of faults caused by damage on hollow fillers during molding comprising:
   an inner layer having opposing first and second surfaces and comprising a thermosetting resin which further includes a plurality of hollow fillers, said hollow fillers being present in an amount of 15% by volume or more and having a specific gravity of 0.1 to 1.2;
   two cloth layers of woven or non-woven fabric, said cloth layers each having outer and inner surfaces and each layer being adhered on said inner surface to one of the opposing first or second surfaces of said inner layer so as to sandwich said inner layer and form an inner multilayer structure; and
   two surface layers each comprising a thermosetting resin matrix which further includes a plurality of reinforcing fibers, said fibers being present in an amount of 20% by volume or more, each surface layer having outer and inner surfaces, each surface layer being adhered on said inner surface to one of the opposing said outer surfaces of said cloth layers so as to sandwich said inner multilayer structure.

2. A molded sheet article according to claim 1, wherein said thermosetting resin of said inner layer is a resin selected from the group consisting of epoxy resin, unsaturated polyester containing resin, urea resin, melamine resin, and phenol resin.

3. A molded sheet article according to claim 1, wherein each of said woven fabric or non-woven fabric is made of a fiber selected from the group consisting of aramid fiber, polyester fiber, nylon fiber, glass fiber, ceramic fiber, and ceramic whisker.

4. A molded sheet article according to claim 1, wherein said woven fabric is applied with a binder so that at least one mesh in said fabric is 0.5 mm$^2$ or less.

5. A molded sheet article according to claim 1, wherein said non-woven fabric has a weight of 5 to 300 g/m$^2$.

6. A molded sheet article according to claim 1, wherein said thermosetting resin of said surface layers is selected from the group consisting of epoxy resin, unsaturated polyester containing resin, urea resin, melamine resin, and phenol resin.

* * * * *